Sept. 18, 1928.

E. LA PLANT 1,684,632

LINK FOR ANTISKID CHAINS

Filed May 31, 1927

Inventor

Edward La Plant

By Clarence A. O'Brien
Attorney

Patented Sept. 18, 1928.

1,684,632

UNITED STATES PATENT OFFICE.

EDWARD LA PLANT, OF ARLEE, MONTANA.

LINK FOR ANTISKID CHAINS.

Application filed May 31, 1927. Serial No. 195,315.

My invention relates to anti-skid chains for vehicle wheels and has for its principal object to provide a link having a ground gripping element having sections extending in directions substantially at right angles with each other so as to prevent skidding of the vehicle wheel transversely as well as providing gripping means for the longitudinal movement thereof.

A further object is to provide a link unit for chains of this character having the gripping element formed integrally therewith and adapted to be cast with the link during the manufacture thereof, which is simple in construction, providing a positive ground gripping means, each link constituting a separate and distinct unit thereby permitting easy replacement thereof and which is inexpensive to manufacture.

Figure 1:
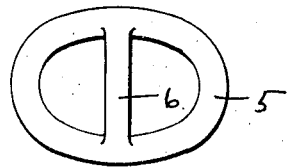
Figure 2:
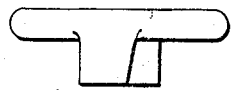
Figure 3:
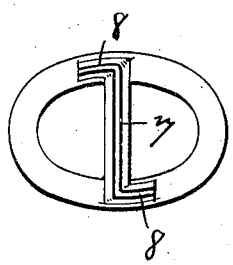
Figure 4:
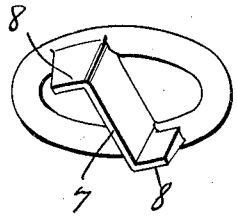

Other objects and advantages will become apparent from the following detailed description when viewed together with the accompanying drawing forming part hereof, wherein:

Figure 1 is a bottom plan view,
Figure 2 is a side elevational view,
Figure 3 is a top plan view, and
Figure 4 is a perspective view.

Referring now to the drawing I have shown my invention comprising a chain link indicated at 5 which may be of any suitable shape or design, the present embodiment disclosing a substantially oval-shape link having a transverse web 6 formed integrally therewith, the rear edge thereof being substantially flush with the base of the link which is designed to engage the surface of the vehicle tire. Upon the opposite or ground engaging side of the link is formed a gripping element comprising an outstanding rib 7 consisting of an intermediate section transversely arranged and end sections 8 extending substantially at right angles thereto and in opposite directions from each other, the sections being arranged substantially parallel with the side portions of the link.

By providing a link of the foregoing construction, it is apparent that the transverse section 7 will form an efficient traction increasing element for the vehicle wheel and the angularly formed sections 8 thereof will provide antiskidding elements to prevent transverse movement of the wheel.

It is apparent that the article is susceptible to various changes and modifications in the construction and design without departing from the spirit of the invention or the scope of the appended claims and I accordingly claim all such forms of the invention to which I am entitled.

I claim:

In a chain link, a continuously formed upstanding rib arranged on one face of the link and constituting a ground gripping element and including a section extending transversely of the link and terminating in relatively short end sections extending at right angles therefrom in opposite directions and substantially parallel with the sides of said links and formed integrally with the chain link.

In testimony whereof I affix my signature.

EDWARD LA PLANT.